United States Patent [19]

Diamond et al.

[11] 4,340,307

[45] Jul. 20, 1982

[54] BICHROMATIC SPECTROPHOTOMETER WITH WAVELENGTH REVERSAL

[75] Inventors: Allen M. Diamond, Huntington Beach; Richard D. Ratz, Irvine, both of Calif.

[73] Assignee: Beckman Instruments, Inc., Fullerton, Calif.

[21] Appl. No.: 166,654

[22] Filed: Jul. 7, 1980

[51] Int. Cl.³ .................... G01J 3/50; G01N 21/31
[52] U.S. Cl. ................................ 356/418; 250/565; 356/220
[58] Field of Search ............... 356/320, 414, 416, 418, 356/425, 434; 250/339, 343, 565, 575; 364/526, 498

[56] References Cited

U.S. PATENT DOCUMENTS

| | | | |
|---|---|---|---|
| 3,089,382 | 5/1963 | Hecht et al. | 356/418 X |
| 3,519,816 | 7/1970 | Bartz et al. | 250/339 |
| 3,583,813 | 6/1971 | Shibata et al. | 250/226 X |
| 3,665,215 | 5/1972 | Boronkay | 307/230 |
| 3,689,158 | 9/1972 | Shifrin | 250/226 X |
| 3,690,772 | 9/1972 | Endl | 250/226 X |
| 3,706,497 | 12/1972 | Lindberg | 356/418 |
| 4,090,789 | 5/1978 | Macemon et al. | 356/246 |
| 4,136,959 | 1/1979 | Honkawa et al. | 356/320 X |

Primary Examiner—F. L. Evans
Attorney, Agent, or Firm—Robert J. Steinmeyer; Robert R. Meads

[57] ABSTRACT

An improved bichromatic or polychromatic spectrophotometer comprising means enabling the user to electronically select which wavelength of a preselected pair of wavelengths shall serve as a "sample" wavelength, with the other then serving as a "reference" wavelength.

8 Claims, 8 Drawing Figures

BICHROMATIC SPECTROPHOTOMETER WITH WAVELENGTH REVERSAL

BACKGROUND OF THE INVENTION

1. Field of the Invention

The present invention relates generally to bichromatic spectrophotometers, i.e., to instruments which measure a characteristic of a sample by comparing the extent to which light at two different wavelengths is transmitted through, or absorbed by, the sample. More particularly, the invention relates to means for selecting the two wavelengths.

2. Description of the Prior Art

The usual application of a bichromatic spectrophotometer is to determine the concentration of a specific chemical in a liquid sample. A "sample" wavelength and a "reference" wavelength are chosen so that the amounts of light transmitted through the sample at those wavelengths are substantially dependent and independent, respectively, of the concentration of the chemical. The spectrophotometer's measurement of the relative amounts of light transmission at these two wavelengths thus indicates the chemical concentration.

In a spectrophotometer, a common method of establishing the wavelength of light transmitted through the sample is by using a broadband light source in combination with a narrowband filter. This allows the wavelength to be selected by selecting the filter. In a bichromatic spectrophotometer, a pair of optical filters commonly is mounted in a single filter holder so that the mounting arrangement determines which of the two filters is the "sample" filter and which is the "reference" filter.

A bichromatic spectrophotometer may comprise a broadband light source which simultaneously illuminates the sample at both the "sample" and "reference" wavelengths and two photosensors respectively mounted relative to a "sample" and a "reference" filter so as to continuously measure the light transmission at the "sample" and "reference" wavelengths, respectively.

More commonly, a bichromatic spectrophotometer comprises only a single photosensor which periodically alternates between measuring the light transmission at the "sample" and "reference" wavelengths. The alternation means typically comprises "sample" and "reference" filters mounted in a rotating disc optically aligned with a stationary aperture, or else comprises the two filters mounted in a stationary filter holder optically aligned with a rotating disc having one or more apertures. An example of the latter arrangement is disclosed in U.S. Pat. No. 3,690,772 to Endl. In addition, the spectrophotometer typically comprises means for producing electrical synchronizing signals which indicate which of the two wavelengths of light is being measured by the photosensor at any moment in time and a demultiplexer or demodulator circuit for directing the photosensor output to a "sample channel" amplifier and a "reference channel" amplifier when the synchronizing signals indicate the photosensor is measuring light transmission at the "sample" and "reference" wavelengths, respectively.

A bichromatic spectrophotometer is commonly accompanied by a large assortment of filter pairs mounted in one or more filter holders so that the user can select the combination of sample and reference wavelengths according to the particular chemical under analysis.

One common shortcoming with prior art bichromatic spectrophotometers is that they cannot reverse the roles of the two filters in a mounted filter pair as the sample and reference filters, respectively. Therefore, two separate mounted filter pairs are required to make both combinations available. For example, suppose a filter holder contains a filter pair in which the sample filter has a 500 nanometer (nm) wavelength and the reference filter has a 600 nm wavelength. If a user requires a 600 nm sample filter and a 500 nm reference filter, the above filter pair will not satisfy the requirement. Instead, a second filter pair having a 600 nm sample filter and a 500 nm reference filter must be mechanically substituted.

SUMMARY OF THE INVENTION

Generally, the invention is an improved bichromatic or polychromatic spectrophotometer comprising means for electronically controlling which wavelength of a preselected pair of wavelengths shall serve as a "sample" wavelength, with the other thereby serving as a "reference" wavelength. In comparison with prior art bichromatic spectrophotometers having a large assortment of mounted filter pairs which furnish various combinations of sample and reference wavelengths, the invention enables the same number of combinations to be furnished by only half of the number of mounted filter pairs.

More specifically, the invention is a spectrophotometer comprising a multiplexer, a demultiplexer, and means for controlling the demultiplexer. The multiplexer produces a multiplexed electrical signal having a value which alternately represents the extent to which light at first and second wavelengths is transmitted through, or absorbed by, the sample being analyzed. The control means supplies a control signal to the demultiplexer. The demultiplexer produces a first output signal proportional to the multiplexed signal during time periods when the control signal has a first value and a second output signal proportional to the multiplexed signal during time periods when the control signal has a second value. The control means has normal and reverse modes of operation such that in the normal mode the control signal has its first and second values when the multiplexed signal represents transmission or absorption at the first and second wavelengths, respectively, and in the reverse mode the control signal has its second and first values when the multiplexed signal represents transmission or absorption at the first and second wavelengths, respectively.

In the preferred embodiment, the first and second output signals from the demultiplexer are directed to a "sample channel" amplifier and a "reference channel" amplifier, respectively. In this embodiment, the first and second wavelengths respectively serve as the sample and reference wavelengths when the control means is in the normal mode, and respectively serve as the reference and sample wavelengths when the control means is in the reverse mode. Thus, by selecting the mode of operation of the control means, one can select which of the two wavelengths shall serve as the "sample" and "reference" wavelengths.

DESCRIPTION OF THE PREFERRED EMBODIMENT

Figure 1:
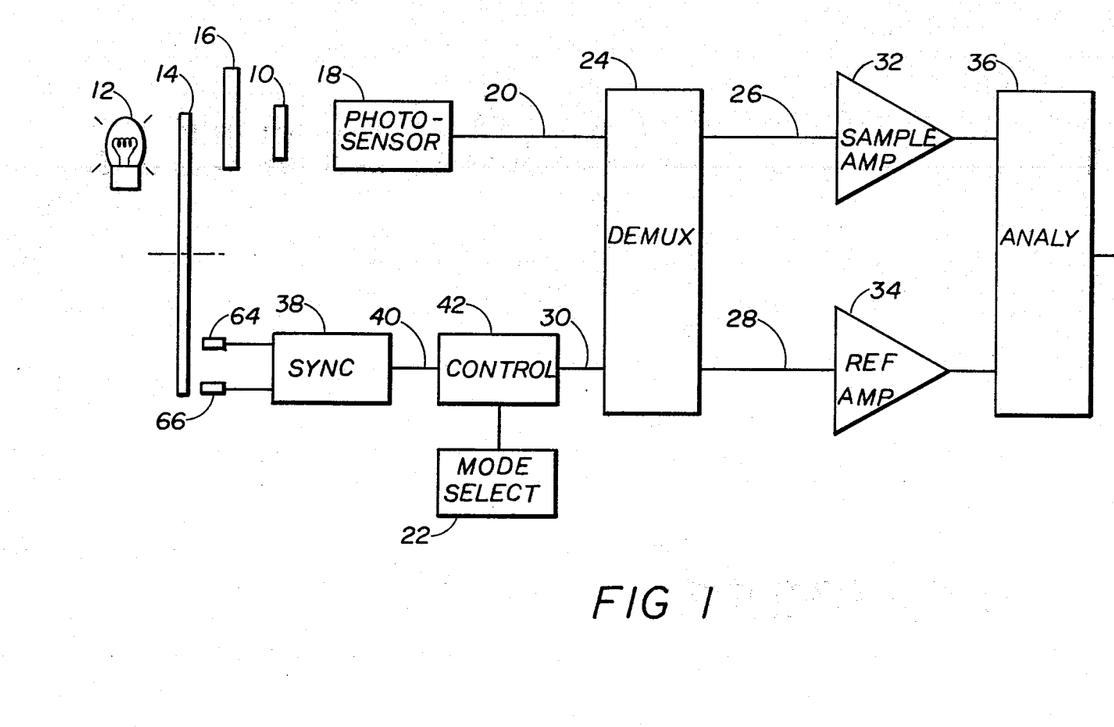
FIG. 1 is a schematic block diagram of the preferred embodiment of the invention.

The present invention shall be explained broadly by reference to FIG. 1, which is a schematic block diagram of the preferred embodiment of the invention.

The embodiment shown in FIG. 1 is a bichromatic spectrophotometer which analyzes a sample 10 by comparing the extent to which light at a "sample" wavelength and a "reference" wavelength is transmitted through the sample.

Light from broadband light source 12 travels through chopper wheel 14, filter holder 16, and sample 10 to photosensor 18. As will be explained in detail below, chopper wheel 14 and filter holder 16 in combination cause the wavelength of the light received by photosensor 18 to alternate between first and second wavelengths. Photosensor 18 thereby produces an electrical signal 20 alternately proportional to the transmittance through sample 10 of light at the two wavelengths. Mode selector 22, to be described shortly, allows a user to determine which of these two wavelengths shall serve as the "sample" and "reference" wavelengths.

Demultiplexer or demodulator circuit 24 divides the alternating or multiplexed photosensor signal 20 into two output signals 26 and 28 respectively proportional to the transmittance through sample 10 of light at the "sample" and "reference" wavelengths. More specifically, demultiplexer 24 receives a control signal 30 having first and second values when photosensor 18 receives light at the "sample" and "reference" wavelengths, respectively. Demultiplexer 24 produces "sample" output signal 26 proportional to photosensor signal 20 during time periods when control signal 30 has its first value, and produces "reference" output signal 28 proportional to photosensor signal 20 during time periods when control signal 30 has its second value.

The "sample" and "reference" output signals 26 and 28 are respectively amplified by "sample channel" amplifier 32 and "reference channel" amplifier 34, whose outputs are applied to analyzer 36.

The remaining elements of the embodiment shown in FIG. 1 relate to the generation of control signal 30.

Synchronization circuit 38 detects the instantaneous position of rotating chopper wheel 14 and thereby determines, as will be more fully explained below, which of the two wavelengths of light is being received by photosensor 18. The circuit produces a sync signal 40 having first and second values when photosensor 18 receives light at the first and second wavelengths, respectively.

A distinctive feature of the invention is control circuit 42, which establishes which of the two wavelengths shall serve as the "sample" and "reference" wavelengths. More specifically, control circuit 42 may be operated in a normal mode or a reverse mode. In the normal mode, the first and second wavelengths respectively serve as the "sample" and "reference" wavelengths. In the reverse mode, the two wavelengths respectively serve as the "reference" and "sample" wavelengths.

Control circuit 42 performs its above described function by supplying to demultiplexer 24 a control signal 30 having first and second values when the photosensor receives light at the "sample" and "reference" wavelengths, respectively. The control circuit determines which of the first and second wavelengths is being received according to the value of sync signal 40. When operating in the normal mode, control circuit 42 produces control signal 30 having its first and second values when sync signal 40 has its first and second values, respectively. When operating in the reverse mode, control circuit 42 produces control signal 30 having its first and second values when sync signal 40 has its second and first values, respectively.

Figure 2:
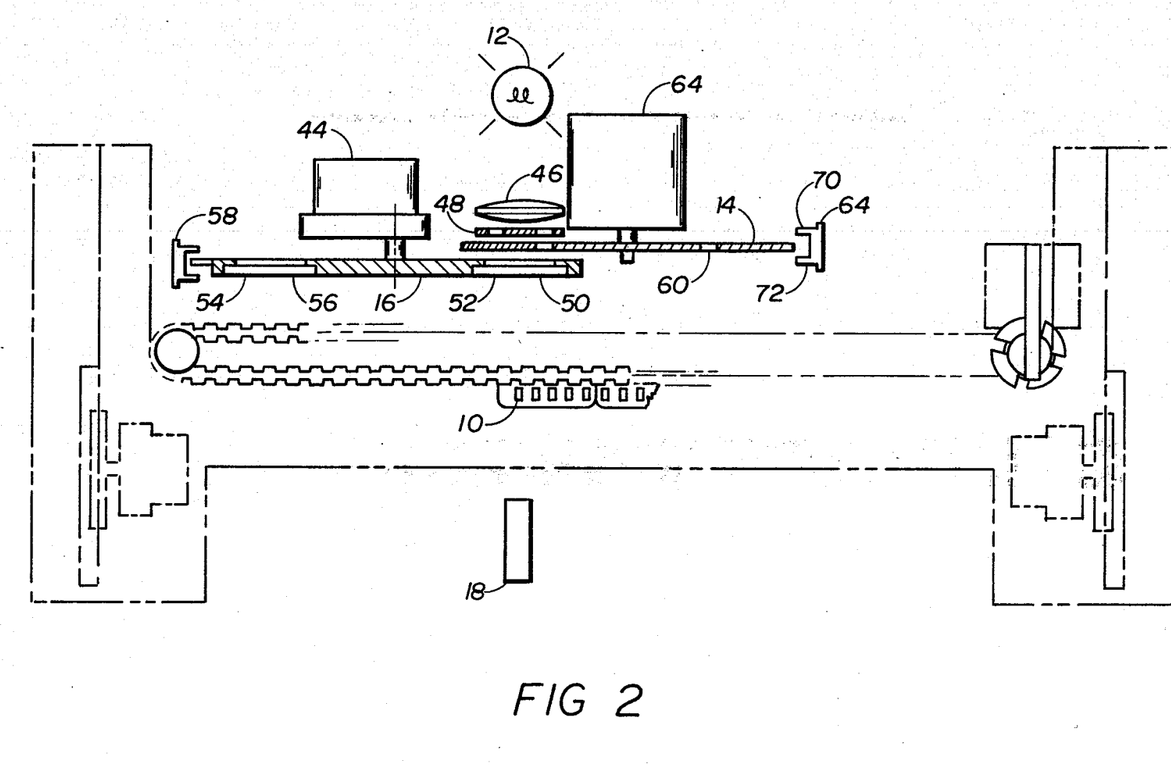
FIG. 2 is a top schematic view of the mechanical and optical components of the preferred embodiment.
Figure 4:
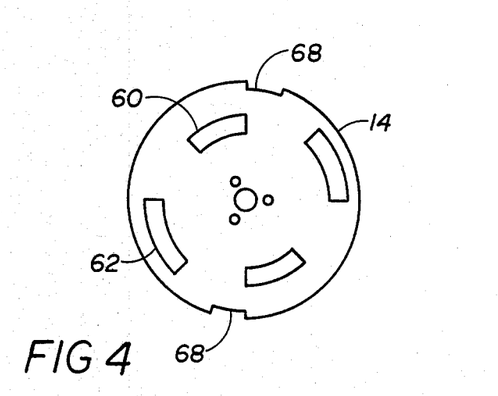
FIG. 4 is a plan view of the chopper wheel used in the preferred embodiment.
Figure 5:
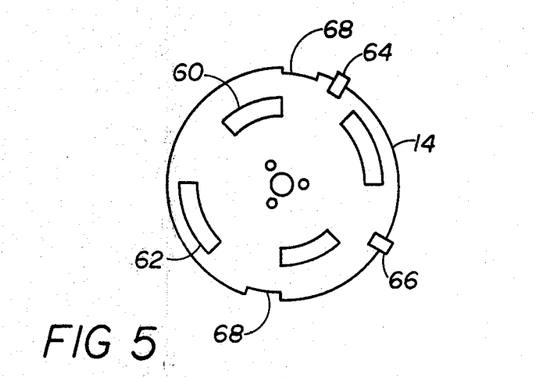
FIG. 5 is a plan view of the chopper wheel and the photodetectors used in the preferred embodiment.

The preferred embodiment of the invention shown in FIGS. 2–6 now will be described in more detail. Chopper wheel 14 and filter holder 16 will be described first, and can best be understood by reference to FIG. 2 showing the mechanical arrangement of the optical components of the preferred embodiment of a spectrophotometer, FIG. 3 showing filter holder 16 in detail, FIG. 4 showing chopper wheel 14 in detail, and FIG. 5 showing the positions of photodetectors 64 and 66 around the perimeter of the chopper wheel.

Figure 3:
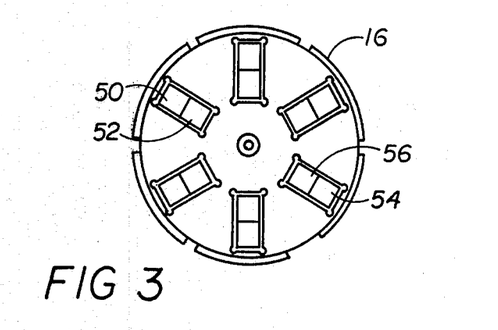
FIG. 3 is a plan view of the filter wheel used in the preferred embodiment.

As shown in FIG. 3, filter holder 16 contains one or more pairs of narrowband filters, the illustrated filter holder containing six filter pairs. During a measurement of a sample, filter holder 16 is stationary. Between measurements, stepping motor 44 may rotate filter holder 16 to select a different one of the six filter pairs for the next measurement. The selected filter pair is the one positioned in the light path from light source 12 through lens 46, aperture 48, and chopper wheel 14. For example, FIG. 2 shows filter holder 16 oriented with respect to lens 46 and aperture 48 so that the filter pair consisting of filters 50 and 52 is in the light path. (Also see FIG. 3.) The other five filter pairs, including the pair consisting of filters 54 and 56, are not in the light path and have no effect on the measurement. If one wanted to perform a measurement using the filter pair 54 and 56, one would direct stepping motor 44 to rotate filter holder 16 by 180 degrees before performing the new measurement. Photodetector 58 is part of the circuitry used to control the stepping motor.

Chopper wheel 14 modulates the passage of light through the filter pair 50 and 52. As shown in FIG. 2, chopper wheel 14 is positioned in the light path through the filter pair so that it would block the light flow if it were completely opaque. However, as shown in FIG. 4, chopper wheel 14 includes one or more openings or apertures 60 which allow light to flow through filter 50 when the chopper wheel is in a certain range of positions, and it includes one or more openings 62 which allow light to flow through filter 52 when the chopper wheel is appropriately positioned. Motor 64 continuously rotates chopper wheel 14 so that the following sequence of four events repeats continuously: (1) light at a first wavelength flows through filter 50, (2) the light is blocked, (3) light at a second wavelength flows through filter 52, (4) the light is blocked.

Figure 6:
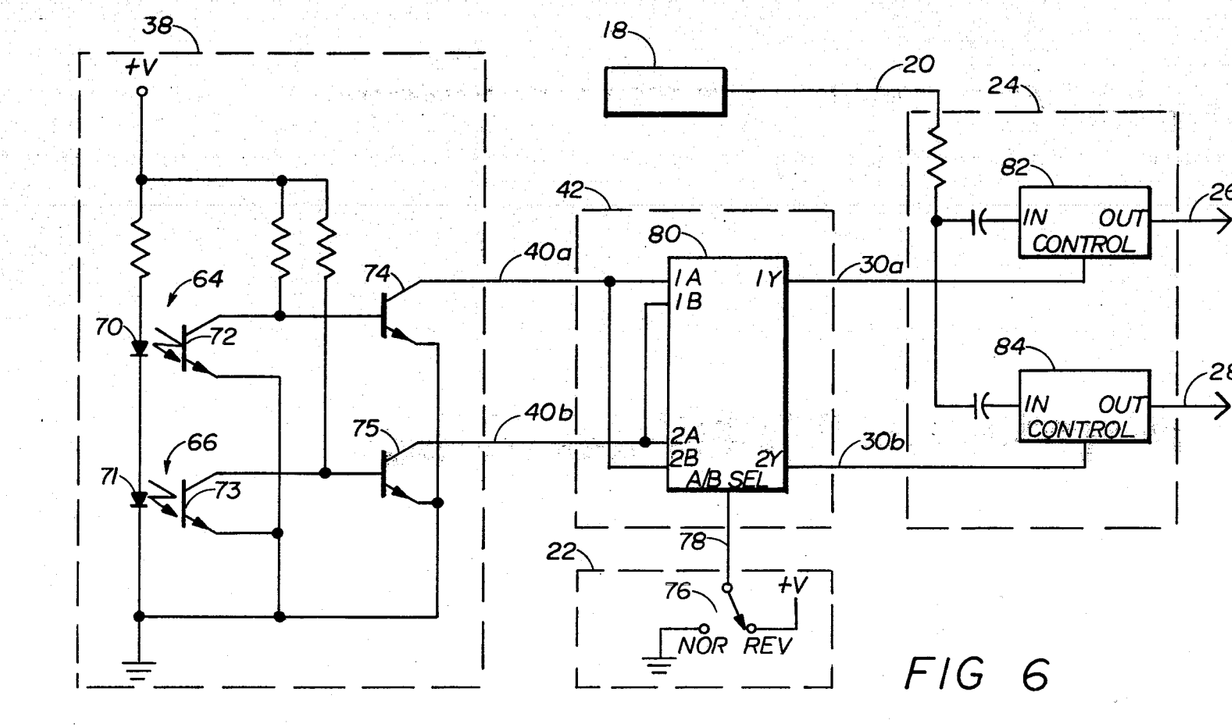
FIG. 6 is a schematic diagram showing some of the electrical circuitry in the preferred embodiment.

Referring now to FIGS. 1 and 6, synchronization circuit 38 detects the instantaneous position of rotating chopper wheel 14 to determine which of the four events defined above is occurring at any moment in time. It produces a digital sync signal 40 consisting of two binary bits 40a and 40b. It sets bit 40a to a binary "one" only when event (1) occurs, i.e., only when photosensor signal 20 indicates transmittance at the first wavelength. It sets bit 40b to a binary "one" only when event (3) occurs, i.e., only when photosensor signal 20 indicates transmittance at the second wavelength. When events (2) or (4) occur, i.e., when the photosensor is dark, it resets both bits 40a and 40b to a binary "zero".

More specifically, synchronization circuit 38 comprises photodetectors 64 and 66 positioned around the perimeter of chopper wheel 14, separated by 90° of arc, as shown in FIGS. 5 and 6. Since the photodetectors are stationary and the chopper wheel is continuously rotating, the chopper wheel's position relative to the photodetectors will change from that shown in FIG. 5 as the chopper wheel rotates.

When filter 50 is illuminated, opening 68 in the perimeter of chopper wheel 14 passes in front of photodetector 64, which produces a "high" signal (representing a binary "one") at bit 40a of sync signal 40. Similarly, when filter 52 is illuminated, opening 68 in the perimeter of chopper wheel 14 passes in front of photodetector 66, which produces a "high" signal (representing a binary "one") at bit 40b. When chopper wheel 14 is positioned so as to block the light from illuminating either filter, opening 68 is not in front of either photodetector 64 or 66 and a "low" signal (representing a binary "zero") is produced at both bits 40a and 40b.

As shown in FIG. 6, photodetectors 64 and 66 may each consist of a light emitting diode (70 and 71) in combination with a phototransistor (72 and 73). FIG. 2 illustrates the positions of light emitting diode 70 and phototransistor 72 facing each other on opposite sides of chopper wheel 14 so that light from diode 70 reaches phototransistor 72 when opening 68 appears between them. The embodiment of sync circuit 38 shown in FIG. 6 also includes transistors 74 and 75 which amplify the signals from phototransistors 72 and 73, respectively.

Much of the foregoing is also disclosed in copending application Ser. No. 059,716, filed on July 23, 1979 by Mason et al. for a "Filter Selector for Multi-Wavelength Spectrometer," assigned to the same assignee as the present application, now abandoned.

Control circuit 42 produces a digital control signal 30 consisting of two binary bits 30a and 30b. It sets to a binary "one" bits 30a and 30b, respectively, only when photosensor signal 20 represents the transmittance through sample 10 of light at the "sample" and "reference" wavelengths.

Control circuit 42 operates in either a normal or a reverse mode. In the normal mode, it designates the first and second wavelengths (transmitted through filters 50 and 52) as the "sample" and "reference" wavelengths, respectively. To indicate when photosensor signal 20 represents transmittance at the "sample" and "reference" wavelengths, it sets to a binary "one" the "sample" bit 30a and "reference" bit 30b when sync bits 40a and 40b, respectively, are set to a "one".

On the other hand, when control circuit 42 operates in the reverse mode, it designates the first and second wavelengths as the "reference" and "sample" wavelengths, respectively. It sets "sample" bit 30a and "reference" bit 30b to a binary "one" when sync bits 40b and 40a, respectively, are set to a "one".

Mode selector 22 selects the operation mode of control circuit 42. As shown in FIG. 6, mode selector 22 may simply consist of manually operated 2-position switch 76 which provides a binary mode select signal 78. The switch selects between low and high values for mode select signal 78, which represent the normal and reverse modes, respectively.

More preferably, mode selector 22 comprises a computer programmed with a list of the filter pairs in filter holder 16. The user directs the computer to select a specific sample wavelength and reference wavelength. The computer consults the list to determine which filter pair and which value of binary mode select signal 78 will produce the desired sample and reference wavelengths, and then generates the proper mode select signal.

Returning to control circuit 42, the preferred embodiment comprises a dual two-to-one multiplexer 80 connected as shown in FIG. 6. If the "A/B select" binary input (connected to receive mode select signal 78) has a low value, the multiplexer connects the 1A and 2A inputs to the 1Y and 2Y outputs, respectively. If the "A/B select" binary input has a high value, the multiplexer connects the 1B and 2B inputs to the 1Y and 2Y outputs, respectively.

The preferred embodiment of demultiplexer 24 comprises two analog switches 82 and 84, each having an analog input connected to receive multiplexed photosensor signal 20, and each having an analog output which respectively provide the signals at the "sample" output 26 and the "reference" output 28.

Each analog switch 82 and 84 has a binary control input respectively connected to "sample" bit 30a and "reference" bit 30b of control signal 30. When the binary value of bit 30a is a "one", signifying transmittance is being measured at the "sample" wavelength, analog switch 82 connects photosensor signal 20 to "sample" output 26. When the binary value of bit 30b is a "one", analog switch 84 connects photosensor signal 20 to "reference" output 28. In other words, the "sample" and "reference" output signals 26 and 28 are proportional to the photosensor signal 20 during the time periods when photosensor 18 measures the transmittance through sample 10 of light at the "sample" and "reference" wavelengths, respectively.

The scope of the invention is not limited to the described embodiments. For example, the synchronization circuit 38 may be any means for producing a sync signal 40 having first and second values when the multiplexed photosensor signal 20 measures the transmittance of sample 10 at the first and second wavelengths, respectively. More specifically, one could eliminate the upper half of synchronization circuit 38 comprising photodetector 64 and transistor 74, thereby obtaining the embodiment shown in FIG. 7. In this embodiment, sync signal 40 consists only of the single bit 40b. Its value is "low" and "high" (i.e., a binary "zero" and "one") when the sample's transmittance is measured at the first and second wavelengths, respectively.

Figure 7:
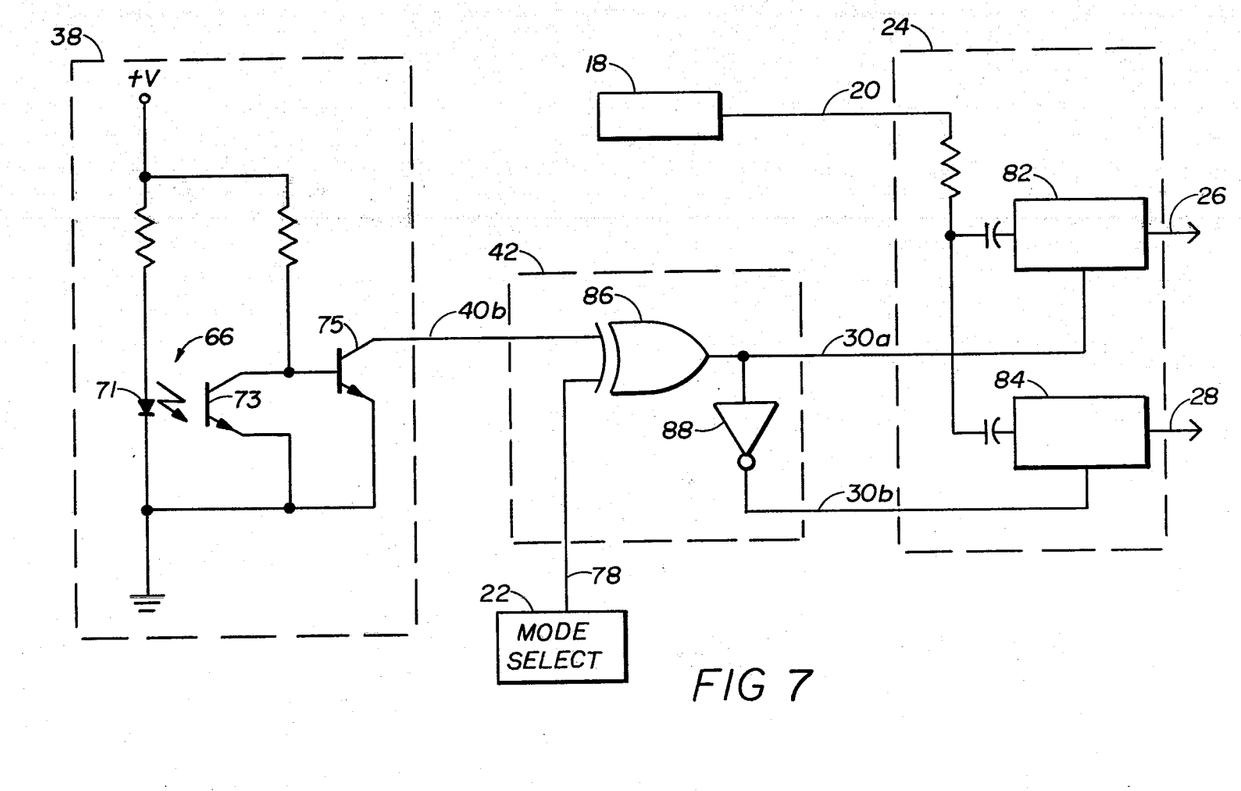
FIG. 7 is a schematic diagram of an alternative embodiment of the circuitry shown in FIG. 6.

FIG. 7 also shows an embodiment of control circuit 42 adapted for receiving the just described one-bit sync signal 40. It comprises an exclusive-OR gate 86 having two inputs respectively connected to receive the sync signal 40 and the mode select signal 78 and having an output which provides the "sample" bit 30a of 2-bit control signal 30. It also comprises an inverter 88 which produces "reference" bit 30b by inverting bit 30a.

Figure 8:
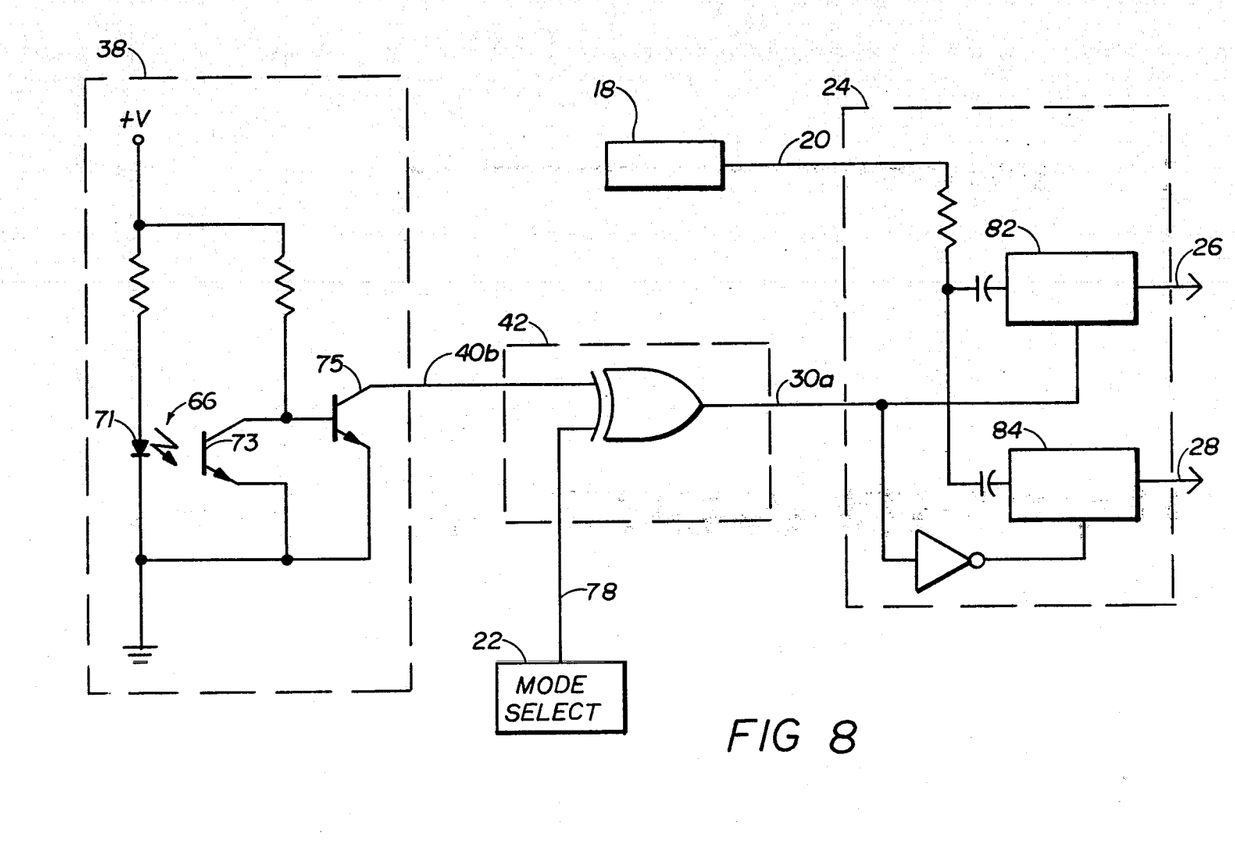
FIG. 8 is a schematic diagram of another alternative embodiment of the circuitry shown in FIG. 6.

FIG. 8 shows an embodiment almost identical to that shown in FIG. 7, except that the dashed lines encompassing the circuitry within control circuit 42 and demultiplexer 24 are redrawn so that inverter 88 is part of the demultiplexer instead of the control circuit. This reduces the control signal 30 to the single binary bit 30a.

Other embodiments of the invention may comprise different arrangements for alternating between the filters at the first and second wavelengths. For example, other embodiments may comprise the conventional arrangement which combines the filter holder and chopper wheel in a single wheel. In this arrangement, the single wheel is identical to chopper wheel 14 shown in FIGS. 4 and 5, except that filters 50 and 52 are mounted on the chopper wheel 14 over openings 60 and 62, respectively.

Throughout the above description, any reference to the "transmittance" of a sample may be replaced by "absorbance", since the two parameters have a one-to-one functional relationship.

In summary, the invention is an improved bichromatic or polychromatic spectrophotometer comprising means for electronically controlling which wavelength of a preselected pair of wavelengths shall serve as the "sample" wavelength, with the other thereby serving as the "reference" wavelength.

In comparison with prior art bichromatic spectrophotometers having a large assortment of mounted filter pairs which furnish various combinations of sample and reference wavelengths, the invention enables the same number of combinations to be furnished by only half the number of mounted filter pairs.

We claim:

1. A spectrophotometer which analyzes a sample by measuring the relative extents to which light at first and second wavelengths is transmitted through, or absorbed by, the sample comprising:
   means for producing a multiplexed electrical signal having a value which alternately represents the relative extents to which light at the first and second wavelengths is transmitted through, or absorbed by, the sample;
   control means for producing a control signal having first and second values, the control means having normal and reverse modes of operation such that in the normal mode the control signal has its first and second values when the multiplexed signal represents transmission or absorption at the first and second wavelengths, respectively, and in the reverse mode the control signal has its first and second values when the multiplexed signal represents transmission or absorption at the second and first wavelengths, respectively; and
   a demultiplexer circuit for producing a first output signal proportional to the multiplexed electrical signal during time periods when the control signal has its first value and a second output signal proportional to the multiplexed electrical signal during time periods when the control signal has its second value.

2. A spectrophotometer according to claim 1, further comprising synchronizing means for producing a sync signal having first and second values during time periods when the multiplexed electrical signal represents the transmission or absorption of light at the first and second wavelengths, respectively;
   wherein the control means determines from the value of the sync signal whether the multiplexed signal represents transmission or absorption of light at the first wavelength or at the second wavelength.

3. A spectrophotometer according to claim 2, further comprising means for producing a mode select binary signal having two possible values which respectively represent a binary "zero" and a binary "one";
   wherein the control circuit assumes the normal mode or the reverse mode according to whether the value of the mode select signal represents a "zero" or "one".

4. A spectrophotometer according to claim 3, wherein
   the sync signal is a two-bit digital signal having a first bit and a second bit, the first bit having a value representing a binary "one" when the sync signal has its first value, and the second bit having a value representing a binary "one" when the sync signal has its second value; and
   the control signal is a two-bit digital signal having a first bit and a second bit, the first bit having a value representing a binary "one" when the control signal has its first value, and the second bit having a value representing a binary "one" when the control signal has its second value.

5. A spectrophotometer according to claim 4, wherein
   the control circuit comprises two two-to-one multiplexers, each having a one-bit select input and a one-bit output, whose select inputs each receive the mode select signal, and whose two outputs respectively produce the two bits of the control signal.

6. A spectrophotometer according to claim 3, wherein
   the sync signal is a binary signal;
   the control signal is a binary signal; and
   the control circuit comprises an "exclusive-OR gate" type of digital logic device having an output terminal which supplies the control signal, an input terminal connected to receive the sync signal, and another input terminal connected to receive the mode select signal.

7. A spectrophotometer according to claim 3, wherein
   the sync signal is a binary signal;
   the control signal is a two-bit digital signal having a first bit and a second bit, the first bit having a value representing a binary "one" when the control signal has its first value, and the second bit having a value representing a binary "one" when the control signal has its second value; and
   the control circuit comprises
   an "exclusive-OR gate" type of digital logic device having an output terminal which produces the first bit of the two-bit control signal, an input terminal connected to receive the sync signal, and another input terminal connected to receive the mode select signal; and
   an "inverter" type of digital logic device having an input terminal connected to the output terminal of the "exclusive-OR gate" device, and having an output terminal which produces the second bit of the two-bit control signal.

8. A spectrophotometer according to claim 3, wherein the means for producing the mode select signal is a circuit comprising a computer which is programmed with a list of available filter pairs;

which receives instructions from a user of the spectrophotometer which determine two wavelengths of light at which the first and second output signals, respectively, are to indicate the relative transmittance or absorbance of the sample;

which consults the list to determine which available filter pair and which value of the mode select signal are needed to operate the spectrophotometer in compliance with the instructions; and which produces the mode select signal having the determined value.

* * * * *